United States Patent Office 3,155,657
Patented Nov. 3, 1964

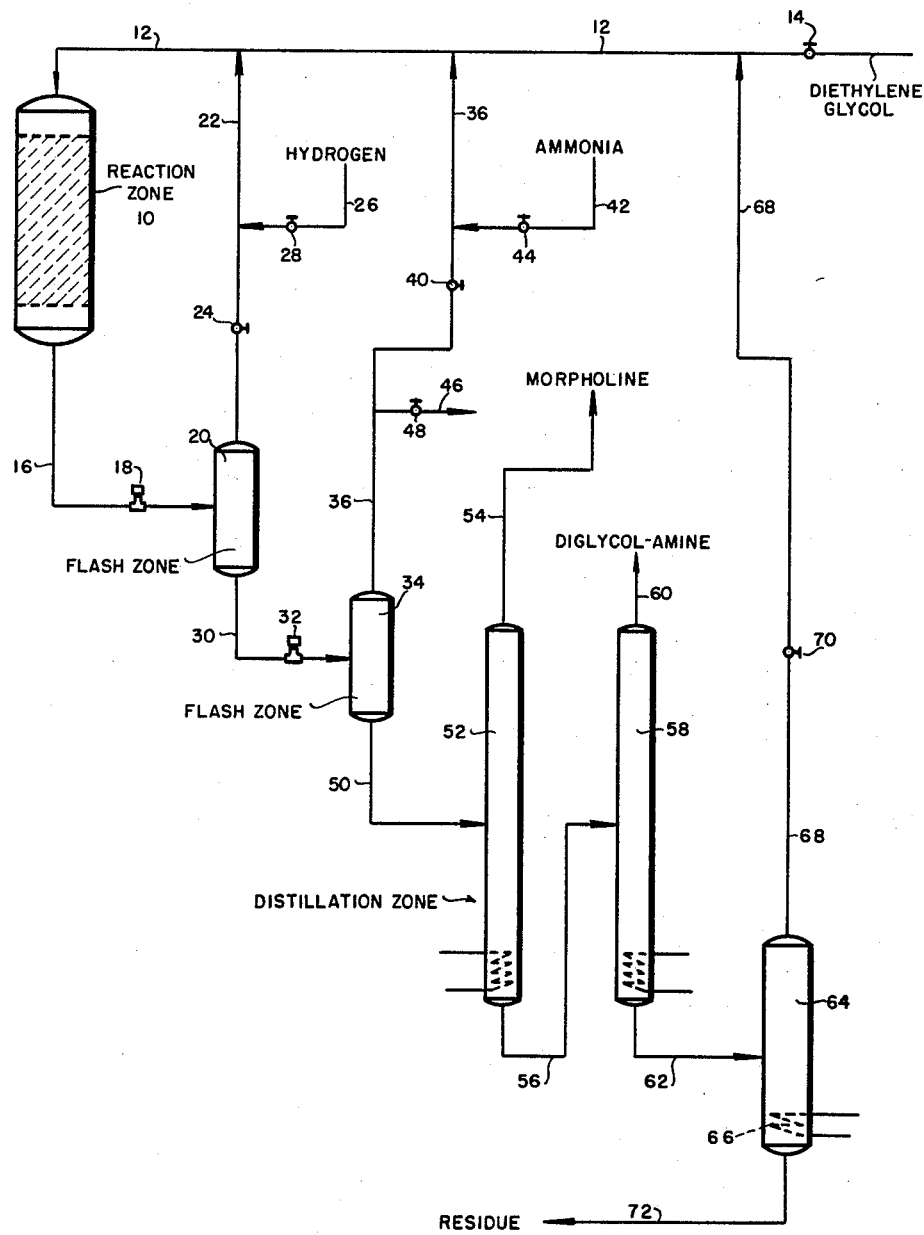

3,155,657
PROCESS FOR THE PRODUCTION OF POLY-
GLYCOLAMINE AND MORPHOLINE
William C. Bedoit, Jr., Houston, Tex., assignor to Jefferson Chemical Company, Inc., Houston, Tex., a corporation of Delaware
Filed July 20, 1961, Ser. No. 125,468
2 Claims. (Cl. 260—247)

This invention relates to a method for producing a cyclic and an acyclic amine. More particularly, this invention relates to an improved method for the simultaneous production of morpholine and of 2-(2-hydroxyethoxy) ethyl amine (hereinafter referred to as diglycolamine) from diethylene glycol.

When diethylene glycol is reacted with ammonia in the presence of a hydrogenation catalyst, the reaction product that is formed will comprise a mixture of compounds including a predominant amount of cyclic morpholine-type compounds and only small amounts of open chain polyglycolamine-type products. Thus, the compound that is preferentially formed is morpholine, a cyclic compound, inasmuch as hydrogenation catalysts normally promote ring closure. Accordingly, when both morpholine and diglycolamine are desired in good yields, the poor selectivity to glycolamine-type products obtained when using glycol and ammonia as starting materials makes the process unattractive for this purpose.

It has been surprisingly discovered in accordance with the present invention, however, that 2-(2-hydroxyethoxy) ethyl amine can be prepared with enhanced yield from diethylene glycol and ammonia together with morpholine when the reaction is conducted in the presence of a catalytically effective amount of ruthenium and when the reaction conditions are adjusted to provide an ethylene glycol conversion of not more than about 85%. In accordance with the present invention, diethylene glycol and from 0.8 to about 10 mols of ammonia per mol of ethylene glycol are brought into contact with a ruthenium catalyst under reaction conditions adjusted to provide not more than about an 85% diethylene glycol conversion, including a temperature of about 150° to about 350° C., a total pressure of about 20 to 500 atmospheres, a contact time of about 5 minutes to about 4 hours. Optionally, the reaction is conducted in the additional presence of added hydrogen or water, or both. When hydrogen is used, the amount employed may suitably be adjusted so that the hydrogen partial pressure constitutes from 5% to 50% of the total pressure. If water is to be added in addition to the amount of water normally produced in the process, the amount may be varied within wide limits but it is desirable that not more than about 50 volume percent of the water be present in the normally liquid reactor charge mixture. The best results are obtainable when diethylene glycol is reacted with from about 1.5 to about 3 mols of ammonia per mol of diethylene glycol in the presence of a ruthenium-type catalyst under reaction conditions selected to provide a diethylene glycol conversion of about 50% to 80%, including a pressure of about 100 to about 300 atmospheres, a temperature of about 180° to 300° C. and a reaction time of about 0.5 to 2 hours with about 50 to 200 atmospheres partial pressure of hydrogen.

The starting materials for the present invention include diethylene glycol and ammonia. As indicated, water and hydrogen may be employed as feed materials, if desired. Glycols higher than diethylene glycol give open chain compounds.

The catalyst to be employed is a ruthenium catalyst, such as ruthenium supported on a suitable base, such as a gamma alumina, charcoal, etc., base. The amount of ruthenium to be employed in the supported catalyst composition (based on the weight of the metal) should preferably be within the range of about 0.2 to 5 wt. percent. Thus, the catalyst composition to be charged to the reaction zone may consist essentially of metallic ruthenium or may comprise a ruthenium compound (e.g. ruthenium oxide) on a support such as gamma alumina.

The present invention will be further illustrated by the accompanying drawing where the only figure is a schematic flow sheet illustrating a preferred method for practicing the present invention on a continuous basis. It will be understood, of course, that the process may also be practiced on a batch basis or a semi-continuous basis, if so desired.

Turning now to the drawing, there is schematically shown a reaction zone 10 containing a fixed bed of pelleted ruthenium on alumina catalyst. A charge line 12 controlled by valve 14 is provided for the reaction zone to permit the introduction of diethylene glycol, ammonia and hydrogen in a manner to be described. Within the reaction zone 10, the diethylene glycol and ammonia react in the presence of a ruthenium on alumina catalyst which comprises, for example, about 1 wt. percent of ruthenium on the alumina carrier. The resultant reaction mixture comprises hydrogen, ammonia, water, morpholine, 2-(2-hydroxyethoxy) ethyl amine and minor reaction by-products. This reaction mixture may be processed for the recovery of morpholine and 2-(2-hydroxyethoxy) ethyl amine in any desired manner. For example, the reaction mixture may be continuously discharged from the reaction zone 10 by way of a discharge line 16 containing a pressure reduction valve 18 leading to a flash zone 20. Pressure is reduced on the reaction mixture on passage of the same through the valve 18 by an amount sufficient to permit selective volatilization of the hydrogen only in the flash zone 20. Hydrogen is removed overhead from the flash zone 20 by way of a line 22 controlled by valve 24 leading to the charge line 12 for the reaction zone 10. Fresh hydrogen may be added at the commencement of operations and thereafter, as needed, by way of a hydrogen charge line 26 controlled by valve 28 leading to the line 22.

The remainder of the reaction mixture is discharged from the flash zone 20 by way of a bottoms line 30 controlled by a pressure reduction valve 32 leading to a second flash zone 34. Pressure is reduced on passage through the valve 32 and into zone 34 by an amount sufficient to permit volatilization of unreacted ammonia and water in the second flash zone 34. Thus, the water and ammonia are withdrawn overhead from the second flash zone 34 by way of a line 36 controlled by a valve 40 leading to the line 12 for the reaction zone 10. If desired, the valve 40 in the line 36 may be closed and the vaporized ammonia and water may be routed by way of a branch line 46 controlled by valve 48 to suitable fractionation facilities (not shown) for the separation of ammonia from water. Thereafter, the thus-separated ammonia and some of the water (if desired) may be recycled by way of an appropriate line (not shown) to the ammonia charge line 42 shown in the drawing.

Fresh ammonia may be added at the beginning of the reaction and thereafter, as needed, by way of an ammonia charge line 42 controlled by valve 44 leading to the charge line 36. It will be understood that the ammonia may be added by line 42 as substantially pure ammonia or in solution in water when added water is to be employed.

The liquid bottoms from the flash zone 34 is discharged by way of a bottoms line 50 leading to a distillation zone of any desired construction which may comprise, for example, a single fractionation column (not shown) or, as shown, a plurality of splitter columns. Thus, in accordance with the embodiment illustrated in the drawing, the bottoms 50 is charged to a first fractionation column 52 wherein the bottoms is separated into an overhead morpholine distillate which is discharged by line 54 and a heavier fraction that is charged by way of a line 56 to a second distillation column 58 wherein 2-(2-hydroxyethoxy) ethyl amine is recovered overhead as a distillate fraction by way of a line 60. The bottoms from the distillation column 58 will contain unreacted diethylene glycol. Accordingy, the bottoms from column 58 may be discharged by way of a line 62 leading, for example, to a third flash zone 64 provided with suitable heating means such as a steam column 66 in order to flash off the diethylene glycol. The diethylene glycol may be taken overhead by way of a line 68 controlled by a line 70 leading to the line 12 for the reaction zone 10. A heavy residue is discharged from the third flash zone 64 by way of a bottoms line 72 for discard from the process. It will be understood that, in accordance with this embodiment, fresh diethylene glycol will be added at the beginning of a run by opening valve 14 and will thereafter be added, as needed, by an appropriate setting of the valve 14.

The invention will be still further illustrated by the following specific examples which are given by way of examples and not as limitations on the scope of this invention.

PROCEDURE AND ANALYTICAL METHODS

To outline the procedure used, this is a typical example. A 310 ml. stainless steel autoclave was charged with 5 g. of 5% ruthenium on alumina catalyst and 55 g. of diethylene glycol. The autoclave was closed and purged with hydrogen by taking it to 500 p.s.i.g. and then venting several times. Forty-two grams of anhydrous ammonia was pressured in from a weighted cylinder and hydrogen was added to give 400 p.s.i.g. total pressure. The vessel was heated and rocked at 240° C. and 3375 autogenous p.s.i.g. for two hours. When it had been cooled and the excess hydrogen and ammonia vented slowly to atmospheric pressure, the contents were filtered and catalyst was washed with benzene and recovered for future use. The colorless filtrate was bottled and analyzed. The 5% ruthenium on charcoal, 5% ruthenium on alumina catalysts and 1% ruthenium on charcoal were commercially available catalysts.

It can be seen by examination of Table I that two analytical methods were used. One, D and T was distillation and titration. Yields were calculated from titration of distillate cuts. When runs were small, losses could decrease yields considerably with this method. The second type of analysis, V.C., was done with vapor chromatography, using an internal standard and calibrations.

*Table II*

CONTINUOUS RUNS

Catalyst: 0.5% ruthenium on ⅛″ alumina pellets
Pressure: 4,000 p.s.i.g.
Hydrogen rate: 200 liters (STP)/hr.

| Run No | M-107 | M-108 | M-110 | M-109 |
|---|---|---|---|---|
| Temp., ° C. in | 229 | 234 | 253 | 257 |
| Temp., ° C. out | 230 | 236 | 257 | 257 |
| Ratio of NH₃ to Diethylene Glycol | 3.04 | 6.04 | 3.04 | 6.04 |
| S.V. G./hr./g. Cat | 2.53 | 2.43 | 2.77 | 2.13 |
| Diethylene Glycol Conversion, Percent | 48.2 | 75.9 | 79.8 | 96.9 |
| Percent Yield Diglycolamine | 42.1 | 26.3 | 20.3 | 6.1 |
| Percent Yield Morpholine | 47.6 | 53.6 | 56.9 | 77.2 |

Table II illustrates the excellent yields of diglycolamine that are obtained at conversions of about 40% to 60%, the acceptable yield obtained at conversion of about 70% to 80% and the unsatisfactory yields obtained at conversions above 95%.

What is claimed is:
1. A method which comprises the steps of contacting a ruthenium on alumina catalyst containing from about 0.2 to about 5 wt. percent of metallic ruthenium with diethylene glycol containing up to 50 vol. percent of water, hydrogen and from about 1.5 to 3 mols of ammonia per mol of diethylene glycol under reaction conditions including a temperature within the range of about 180° to 300° C., a pressure within the range of about 100 to 300 atmospheres including a hydrogen partial pressure of about 50 to about 200 atmospheres and a reaction time within the range of about 0.2 to 2 hours sufficient to effect conversion of from about 40% to about 80% of the said diethylene glycol to thereby provide a reaction mixture comprising 2-(2-hydroxyethoxy) ethyl amine and morpholine and recovering said 2-(2-hydroxyethoxy) ethyl amine and morpholine from said reaction mixture.

2. A method for the continuous production of 2-(2-hydroxyethoxy) ethyl amine and morpholine which comprises charging diethylene glycol containing up to 50 vol. percent of water, hydrogen and ammonia to a reaction zone containing a fixed bed of a ruthenium oxide on alumina catalyst containing from about 0.2 to about 5 wt. percent of metallic ruthenium under reaction conditions including a temperature within the range of about 150° to 300° C., a pressure within the range of about 20 to 500 atmospheres including a hydrogen partial pressure

*Table I*

MORPHOLINE AND DIGLYCOLAMINE FROM DIALKANOLAMINES

| Catalyst | G. | Reagents, g. | | | Reaction Conditions | | | Conversion of DEG, percent | Percent Yield | | | |
| | | Diethylene glycol | Ammonia | Water | Time, hr. | Temp., ° C. | Press., p.s.i.g. | | Morpholine | Diglycolamine | Other | Analysis |
|---|---|---|---|---|---|---|---|---|---|---|---|---|
| 5% Ru on Charcoal | 4 | 40 | 20 | -------- | 2.0 | 260 | 2,175 | 93 | 14 | 4 | High boiling residue, 70; nine low boiling products. | V.C. (b). |
| Do | 3 | 50 | 25 | -------- | 1.0 | 250 | 2,300 | 71.4 | 19.6 | 37.1 | High boiling, 26.2; low boil- 16.9. | V.C. |
| 1% Ru on Charcoal | 20 | 106 | 51 | -------- | 2.0 | 240 | 1,125 | (¹) | 0.3 | 1.6 | -------- | D+T. |
| 5% Ru on Alumina | 5 | 55 | 42 | -------- | 2.1 | 240 | 3,375 | 68.7 | 22.8 | 71.2 | -------- | V.C. |

¹ Very low.

EXAMPLE II

A series of continuous runs were made under a variety of reaction conditions and the conditions employed together with the results obtained are set forth in Table II.

constituting from about 5% to about 50% of the total pressure and a contact time within the range of about 5 minutes to 4 hours sufficient to convert from about 40% to about 80% of said diethylene glycol to thereby provide a reaction mixture comprising ammonia, morpholine, 2-

(2-hydroxyethoxy) ethyl amine and higher boiling products, continually withdrawing a stream of reaction products from said reaction zone, continually fractionating said reaction mixture in a distillation zone into an aqueous ammonia fraction, a morpholine fraction, a 2-(2-hydroxyethoxy) ethyl amine fraction, a diethylene glycol fraction and a residue fraction comprising said higher boiling products and continually recycling to said reaction zone at least a portion of said ammonia and diethylene glycol, from about 0.8 to 10 mols of ammonia being charged per mol of diethylene glycol.

References Cited in the file of this patent
UNITED STATES PATENTS

| | | |
|---|---|---|
| 2,412,209 | Dickey et al. | Dec. 10, 1946 |
| 2,529,923 | Dickey et al. | Nov. 14, 1950 |
| 2,754,330 | Schreyer | July 10, 1956 |